(12) United States Patent
Mondejar Jimenez

(10) Patent No.: US 7,347,654 B2
(45) Date of Patent: Mar. 25, 2008

(54) STACKING POST FOR CONTAINER CHASSIS

(76) Inventor: Josefina Mondejar Jimenez, Olazbide 8, Olaz-Valle de Egues, Navarra (ES) 31620

( * ) Notice: Subject to any disclaimer, the term of this patent is extended or adjusted under 35 U.S.C. 154(b) by 0 days.

(21) Appl. No.: 11/633,915

(22) Filed: Dec. 5, 2006

(65) Prior Publication Data

US 2007/0160453 A1    Jul. 12, 2007

(30) Foreign Application Priority Data

Dec. 5, 2005  (ES) ................................ 200503013

(51) Int. Cl.
*B60P 7/08*    (2006.01)
(52) U.S. Cl. .......................................... 410/43; 410/32
(58) Field of Classification Search ................ 410/31, 410/32, 35, 43, 153; 211/41.1, 195; 248/351
See application file for complete search history.

(56) References Cited

U.S. PATENT DOCUMENTS 5,876,165 A * 3/1999 Campbell .................... 410/43

* cited by examiner

*Primary Examiner*—Stephen Gordon
(74) *Attorney, Agent, or Firm*—Merchant & Gould P.C.

(57) ABSTRACT

The present invention relates to a stacking post for container chassis, comprising a grooved vertical body (1), between the walls of which pallets (3-3'-3") are linked which project from the grooved body in a portion having a greater width and being able to swing between an extracted position (3') and a retracted position (3"). One of the walls (2) of the grooved body (1) has externally attached thereto a shifting rake (7) forming a locking mechanism for locking the pallets in the extracted position (3').

3 Claims, 3 Drawing Sheets

STACKING POST FOR CONTAINER CHASSIS

FIELD OF THE INVENTION

The present invention relates to a stacking post for container chassis, and more specifically for containers intended for the transport and storage of parts or components of a generally planar configuration, such as components or parts of automotive vehicle bodies, which are arranged in different levels, supported by the posts of the chassis.

The post of the invention is of the type formed by a grooved body with a U-shaped section between the walls of which pallets are linked, according to axes which are perpendicular to said walls, which pallets can swing about their hinge pins between an extracted position, in which they extend outside the grooved body to define supports for the parts to be transported, and a retracted position, in which the pallets are folded against said body.

BACKGROUND OF THE INVENTION

Posts of the type set forth are described, for example, in utility model 1038290 and in ES 2221593. The different pallets of each post are connected to one another with means causing the successive swinging of said pallets, from the retracted position to the extracted position, from the swinging of a first pallet, which can be the lower one. The pallets are furthermore pushed towards the retracted position by means of a spring, such that as the parts are unloaded, the pallets fold automatically. The pallets have an inner portion that is located within the grooved body, through which it is linked to said body, and an outer portion which is located outside the grooved body and forms the support for the parts to be transported when the pallets are arranged in the extracted position. According to the application of the container, this outer portion can adopt different configurations and have a width that is approximately equal to the outer width of the body or greater, in which case it would laterally project therefrom.

The posts of the type set forth have the drawback that when the container is being handled, the transported parts can move given that the extracted position of the pallets is neither stable nor locked.

DESCRIPTION OF THE INVENTION

The object of the present invention is to eliminate the drawback set forth by means of a post having means which allow locking the pallets when they are in the extracted position, securing this position and thus preventing the transported parts from being able to accidentally move.

The post of the invention is of the type set forth in which the extracted portion of the pallets has a greater width than the grooved body and laterally projects from at least one of the side walls of the body.

According to the present invention, one of the walls of the grooved body has externally attached along the length thereof a rake that can shift in both the longitudinal and transverse directions. This rake is provided on its front longitudinal edge, the one adjacent to the free longitudinal edge of the wall of the grooved body, with transverse notches separating the teeth of said rake and which have a width which is slightly greater than the thickness of the pallets. The rake is supported by two levers, an upper lever and lower lever, which are linked at an intermediate point to the wall of the grooved body, whereas at one of their ends they are linked to the rake and at the opposite end to a bar which is parallel to the rake and can shift like said rake.

The shifting of the rake and bar occurs when the levers swing between full positions in one of which, referred to as the inoperative position, the teeth of the rake do not frontally project from the front longitudinal edge of the wall of the body which the levers are linked to, and another position referred to as the active position, in which the teeth frontally project with respect to said edge and the notches separating every two consecutive teeth are opposite to the pallets when the latter are in their extracted position to brace the opposite edge of said pallets, in this position the rake being used as a locking element for locking the pallets to prevent them from swinging towards their retracted position.

When the two levers swing from one position to another, the rake and bar are shifted in the longitudinal and transverse directions.

The bar will preferably be pushed longitudinally in one direction by means of a spring to constantly push the bar towards one of the full positions. The spring can be arranged, for example, between the lower end of the bar and an integral stop of the wall of the body, such that said spring pushes the bar upwards.

The levers can have an angular layout, equal arms, the linkage point thereof with the wall of the grooved body can coincide with the vertex of the angle.

BRIEF DESCRIPTION OF THE DRAWINGS

The constitution and operation of the post of the invention will be better understood with the following description made with reference to the attached drawings in which a non-limiting embodiment is shown.

In the drawings:

FIG. 1 shows a post comprising a body 1 having a grooved configuration, with a U-shaped section, between the side walls 2 of which pallets 3 are linked according to axes perpendicular to the walls 2. These pallets 3 include an inner portion 4, which is located inside the grooved body 1 and through which they are linked between the walls 2, and an outer portion 5 which is located outside the grooved body and has a greater width than the latter, such that they laterally project with respect to at least one of its walls.

The pallets 3 can swing between an extracted position 3' in which portion 5 extends outside the grooved body, and another retracted position 3" in which this portion 5' is folded against the body.

The different pallets are connected to one another by means of braces 6 causing the successive swinging of said walls from the retracted position 3" to the extracted position 3' from the swinging of a first pallet, which can be the lower one. The pallets are furthermore pushed towards the retracted position 3" by means of a spring, not shown.

Figure 1:
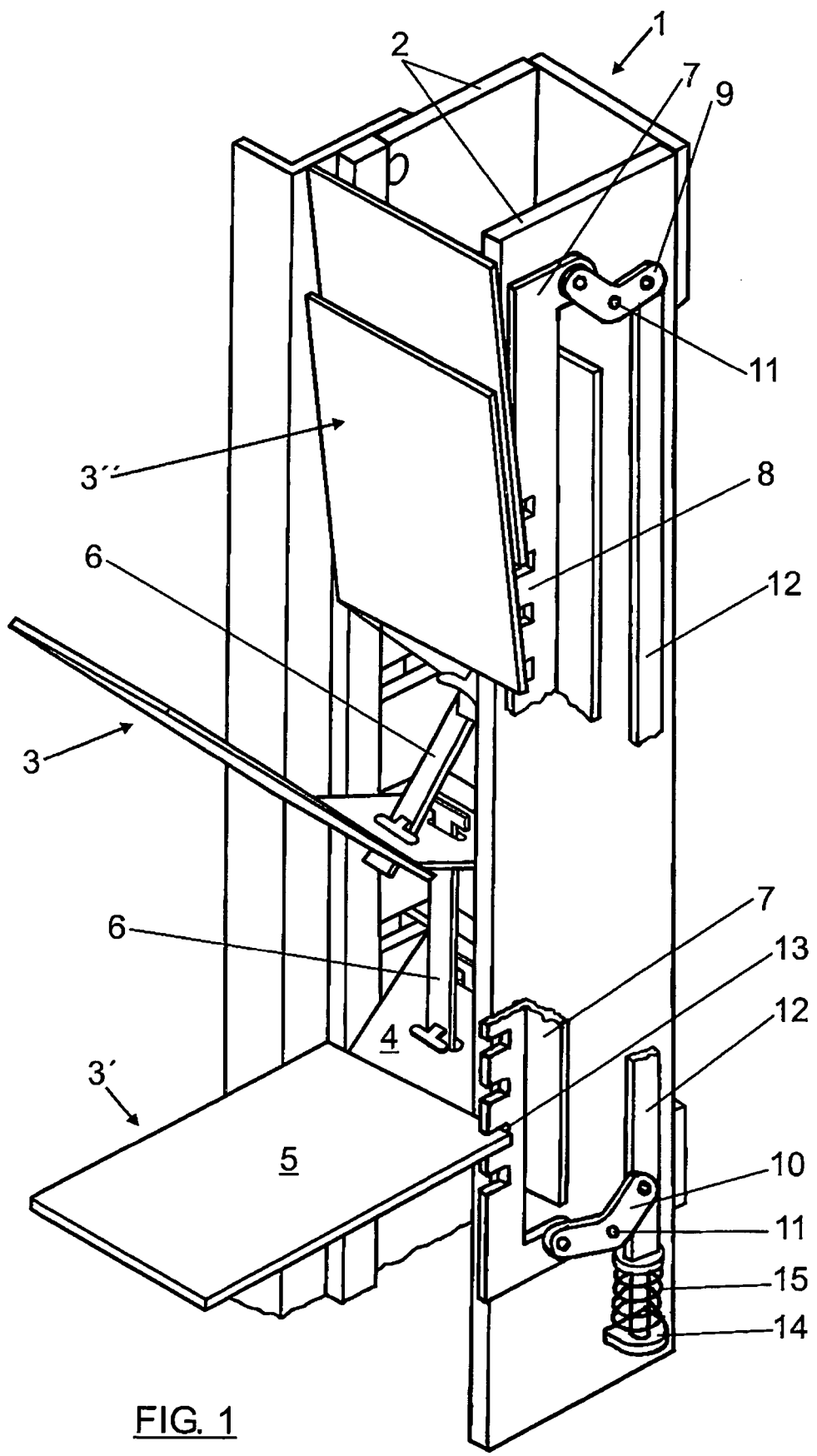
FIG. 1 shows a perspective view of a post formed according to the invention in which the locking means for locking the pallets are in the inoperative position in their upper part and in the active position in the lower part.

The pallets can have a configuration that is different from the one shown in FIG. 1 and can also be connected to one another by means different from the ones shown with reference number 6 to cause the successive swinging of said pallets.

In any case, in the post of the invention the outer portion 5 of the pallets will be of a greater width than the grooved body 1, such that they laterally project with respect to at least one of its walls 2.

According to the present invention, one of the side walls 2 of the grooved body has externally attached along the length thereof a rake 7, the teeth 8 of which are aimed towards the free edge of the wall 2. The rake 7 is supported by two levers, an upper lever 9 and another lower lever 10, both linked to the wall 2 of the grooved body 1 through an intermediate point 11 thereof.

These two levers are linked to the rake 7 at one of their ends, whereas at the opposite end they are linked to a bar 12 parallel to the rake 7.

The levers 10 can have an angular layout, the linkage point 11 coinciding with the vertex of the levers.

With the described constitution, the rake 7 and the bar 12 can shift longitudinally and transversally by means of the swinging of the levers 9 and 10. The movement of the levers 9 and 10, rake 7 and bar 12 occurs between two full positions, an inoperative position, shown in the upper part of FIG. 1, as well as in FIGS. 2, 3 and 6, in which the rake 7 occupies a full upper position and the teeth 8 do not project with respect to the free longitudinal edge of the wall 2, and another active position, shown in the lower part of the FIG. 1, as well as in FIGS. 4, 5 and 7, in which the rake 7 occupies a full lower position and the teeth 8 project with respect to the free longitudinal edge of the wall 2, and the bar 12 occupies a full upper position.

Figure 7:
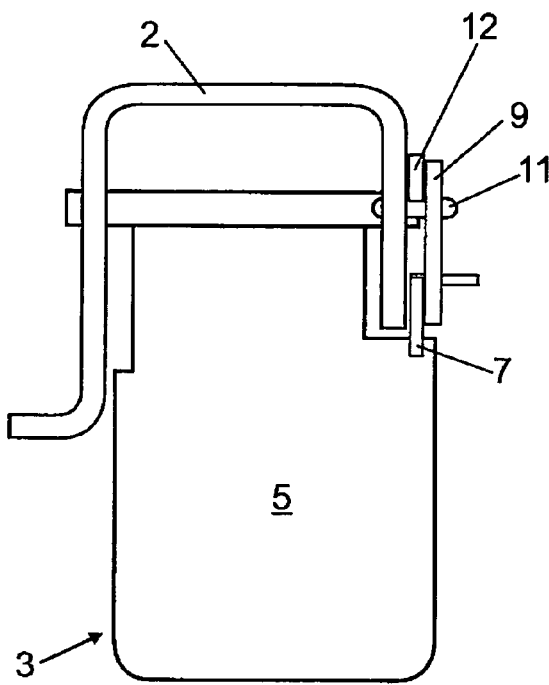
FIG. 7 shows a plan view similar to that of FIG. 6, with the locking means in the active position.

In this active position of the levers 9 and 10, rake 7 and bar 12, in which, as indicated, the teeth 8 project from the free longitudinal edge of the wall 2, the notches 13 separating every two consecutive teeth are located at the same height as the outer portion 5 of the pallets when the latter are in the extracted position 3', FIGS. 1 and 7, such that they will partially brace this portion of the pallets, acting as locking elements against any accidental movement of the pallets.

Figure 4:
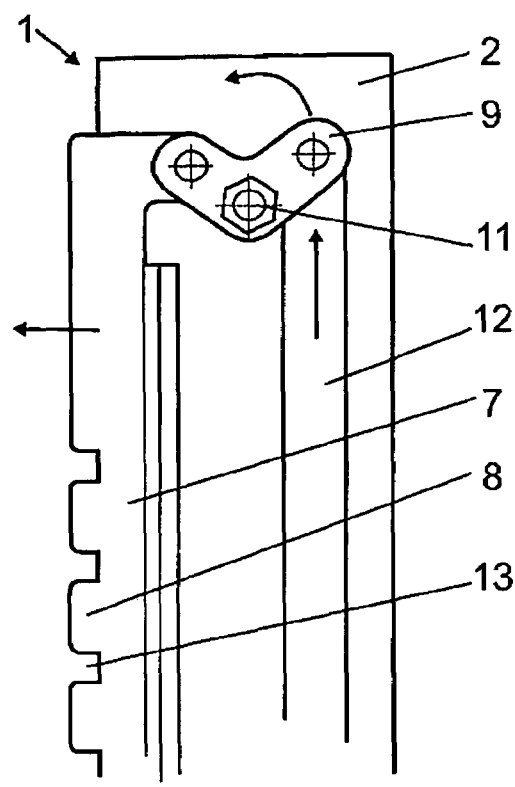
FIG. 4 shows a view similar to that of FIG. 2, with the locking means in the active position.
Figure 3:
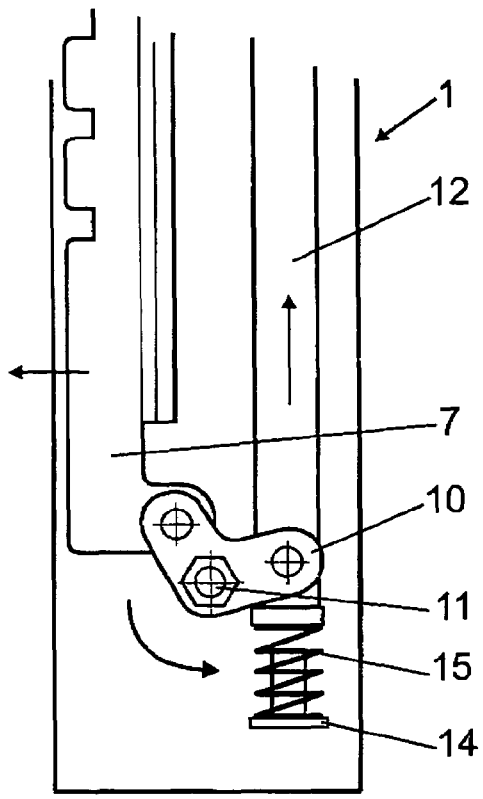
FIG. 3 shows a side elevational view of the lower part of the post, showing the locking means in the inoperative position.
Figure 5:
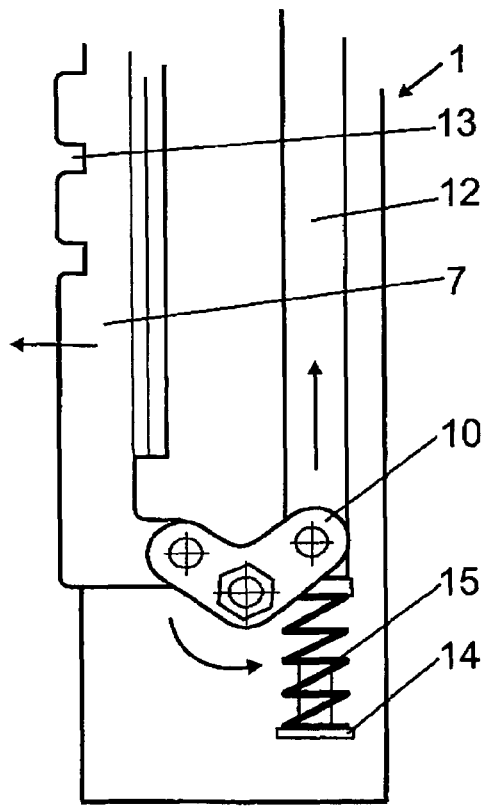
FIG. 5 shows an elevational view similar to that of FIG. 3, with the locking means in the active position.

As can be seen in FIGS. 1, 3 and 5, a compression spring 15 is arranged between the lower end of the bar 12 and an integral stop 14 of the wall 2 of the body 1, which spring constantly pushes the bar 12 towards the full upper position shown in FIGS. 4 and 5, in which the rake 7 is located in the active position, i.e. in the locking position for locking the pallets 3.

Means are provided with the described constitution which allow blocking all the pallets which are in the extracted position, preventing accidental movements or shifting thereof, thus securing the position of the transported parts while the container is being handled.

Figure 2:
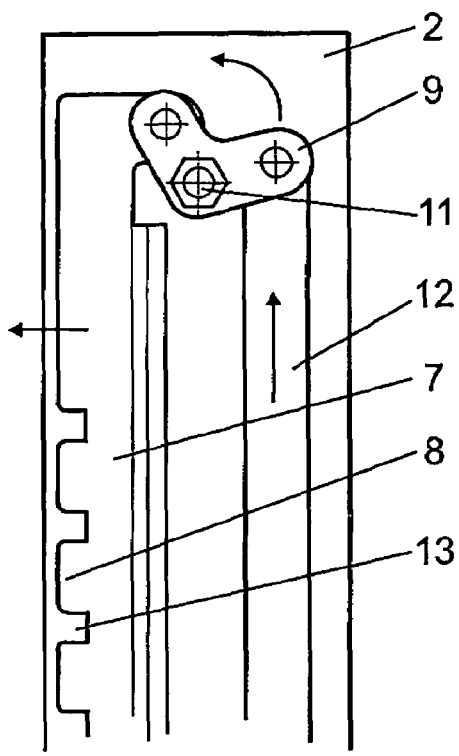
FIG. 2 shows a partial side elevational view of the upper part of the post, with the locking means for locking the pallets in the inoperative position.
Figure 6:
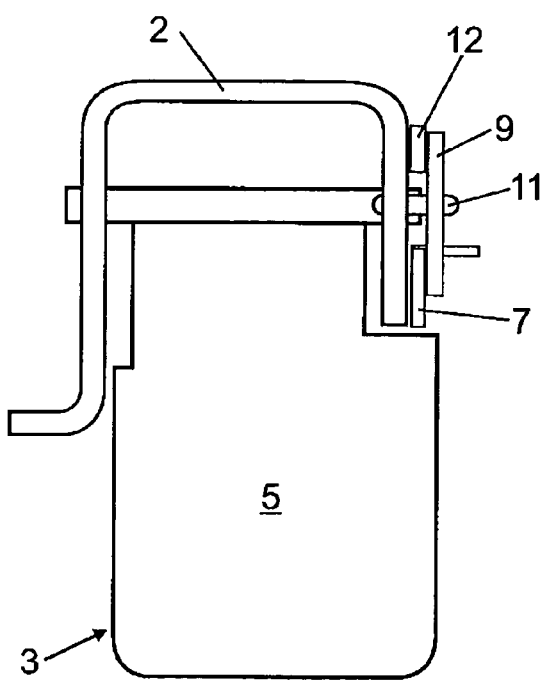
FIG. 6 shows a plan view of the post, with the pallets extracted and the locking means thereof in the inoperative position.

To go from the active position shown in the lower part of FIG. 1 and in FIGS. 4, 5 and 7, to the inoperative position shown in the upper part of FIG. 1 and in FIGS. 2, 3 and 6, it is enough to act on the levers 9 or 10, or on the rake 7 or bar 12, for it to shift to the inoperative position, in which the spring 15 will be compressed, which operation can be achieved through any mechanism. In this inoperative position the pallets are free to be folded to position 3", FIG. 1.

The system can be installed so that it can operate in the reverse manner, just by changing the position of the spring 15, locating it on the upper end of the bar 12, or substituting the compression spring 15 with an extension spring. With the embodiment shown in the drawings, the spring 15 pushes the system towards the locking or active position, whereas if the spring were to act in the opposite direction it would push the system towards the inoperative position.

The rake 7 can be formed by a flat bar or an angle bar, as is shown in the drawings.

The invention claimed is:

1. A stacking post for container chassis, comprising a vertical grooved body with a U-shaped section, between walls of which pallets are linked according to axes perpendicular to said walls, which project from the body in a portion having a width that is greater than a width of said body and can swing between an extracted position in which said pallets extend outside the grooved body, and another retracted position in which said pallets are folded against said body, wherein one of the walls of the grooved body has externally attached along the length thereof a shifting rake having on its front longitudinal edge transverse notches with a width that is slightly greater than a thickness of the pallets; the rake of which is supported by two levers, an upper lever and another lower lever, which are linked at an intermediate point to the wall of the body, whereas said levers whereas they are linked to the rake at one of their ends and to a bar at an opposite end which is parallel to the rake and can shift longitudinally; the levers of which swing between two full positions, an inoperative position, in which teeth of the rake do not frontally project from a front longitudinal edge of the wall of the body which said rake is attached to, and another active position in which the teeth frontally project with respect to said wall edge and ones of the notches separating every two consecutive ones of said teeth are opposite to the pallets in the extracted position thereof so as to brace an opposite edge of the pallet portions.

2. A post according to claim 1, wherein the levers have an angular layout, with equal arms, the respective intermediate point defining linkage point of these levers coinciding with a vertex of the angle of the layout.

3. A post according to claim 1, wherein the mentioned bar is pushed in one direction by means of a spring pushing the levers, rake and bar towards the active or inoperative position.

* * * * *